(12) United States Patent
Cok

(10) Patent No.: US 7,400,345 B2
(45) Date of Patent: Jul. 15, 2008

(54) OLED DISPLAY WITH ASPECT RATIO COMPENSATION

(75) Inventor: Ronald S. Cok, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 434 days.

(21) Appl. No.: 10/970,908

(22) Filed: Oct. 22, 2004

(65) Prior Publication Data

US 2006/0087588 A1    Apr. 27, 2006

(51) Int. Cl.
*H04N 5/46* (2006.01)

(52) U.S. Cl. .................. 348/173; 348/556; 348/801

(58) Field of Classification Search ............ 348/173, 348/913, 556, 557, 801, 802; 345/211, 76–78
See application file for complete search history.

(56) References Cited

U.S. PATENT DOCUMENTS

| | | | | |
|---|---|---|---|---|
| 4,670,784 | A * | 6/1987 | Goldberg | .................. 348/556 |
| 6,320,325 | B1 | 11/2001 | Cok et al. | |
| 6,359,398 | B1 | 3/2002 | Nakajima et al. | |
| 6,369,851 | B1 | 4/2002 | Marflak et al. | |
| 6,414,661 | B1 | 7/2002 | Shen et al. | |
| 6,429,894 | B1 * | 8/2002 | Hicks | ....................... 348/173 |
| 6,501,230 | B1 * | 12/2002 | Feldman | ................ 315/169.3 |
| 6,504,565 | B1 | 1/2003 | Narital et al. | |
| 6,720,942 | B2 | 4/2004 | Lee et al. | |
| 2002/0167474 | A1 | 11/2002 | Everitt | |
| 2004/0032382 | A1 | 2/2004 | Cok et al. | |
| 2004/0070558 | A1 | 4/2004 | Cok et al. | |
| 2004/0150590 | A1 | 8/2004 | Cok et al. | |
| 2004/0188687 | A1 | 9/2004 | Arnold et al. | |
| 2004/0200953 | A1 | 10/2004 | Cok et al. | |

FOREIGN PATENT DOCUMENTS

WO    2004/027744    4/2004

\* cited by examiner

*Primary Examiner*—M. Lee
(74) *Attorney, Agent, or Firm*—Andrew J. Anderson; Stephen H. Shaw

(57) ABSTRACT

A method for uniformly aging an OLED display device, the OLED display device including a display screen with a screen aspect ratio, the method comprising: receiving a first external video signal having a first signal aspect ratio different from the screen aspect ratio; illuminating a primary region of the OLED display in response to the first external video signal, whereby a secondary region of the OLED display is not illuminated in response to the first external video signal; receiving a second external video signal having a second signal aspect ratio different from the first external video signal aspect ratio, wherein the display area corresponding to the second signal aspect ratio includes at least a portion of each of the primary and of the secondary regions of the OLED display; generating a regional correction value corresponding to the primary and secondary regions of the OLED display; employing the regional correction value to correct the second external video signal to compensate for differential aging in the included portions of the primary and secondary regions of the OLED display resulting from differential illumination of the primary and secondary regions of the OLED display in response to the first external video signal; and illuminating the OLED display in response to the corrected second external video signal.

27 Claims, 6 Drawing Sheets

OLED DISPLAY WITH ASPECT RATIO COMPENSATION

FIELD OF THE INVENTION

This invention relates to methods and apparatus for use in conjunction with display device. More particularly, these inventions relate to methods and apparatus for maintaining the uniformity of a display device.

BACKGROUND OF THE INVENTION

All televisions utilize a display device to transform video information into light. This is typically accomplished through the use of electronic controls that convert the video information into control signals that operate the display device. However, display devices may vary in their size, resolution, and aspect ratio, among other characteristics. Likewise, the video information format, resolution, and aspect ratio may vary, Hence, the video information provided to a television may not correspond to the characteristics of the display device used in the television or other display device. In particular, the aspect ratio of the video information may not match the aspect ratio of the display.

This problem typically arises when video signals formatted with one aspect ratio are displayed on a television with a display device having a different aspect ratio. The aspect ratio of a television picture image is a ratio of horizontal length to vertical length, expressed in relative units. Standard video signals, such as NTSC and PAL video signals, are formatted with a 4:3 aspect ratio (i.e., 1.33 aspect ratio), whereas non-standard video signals, such as HDTV video signals, are formatted with an aspect ratio greater than the standard 4:3 aspect ratio. For example, an HDTV video signal is typically formatted with a 16:9 aspect ratio (i.e., 1.77 aspect ratio). Modern cinematographic theater movies, not made expressly for conventional television, are typically films with aspect ratios greater than 1.33, typically ranging between 1.65 and 2.35.

When standard video signals are displayed on a standard television screen (i.e., a television screen having a 1.33 aspect ratio), the picture image appears on the entire television screen. As long as these standard video signals are displayed on a standard television screen, the display device is illuminated over the entire viewing area of the display. When a non-standard video signal having a different aspect ratio, such as an HDTV video signal, is displayed on a standard television screen, either the image needs to be cropped or distorted to fit the standard screen aspect ratio, or the picture image may appear in its original aspect ratio on only a portion of the screen (e.g., on the middle horizontal region of the television screen with horizontal black bars on the respective top and bottom regions of the television screen). As a result, a region of the display that would normally be illuminated in response to a standard video signal is not illuminated in response to the non-standard video signal. Likewise, television screens having a 16:9 aspect ratio may illuminate only the central portion of the display and have black vertical bars on either side of the screen when displaying a standard video signal.

For example, referring to FIG. 2, a first display device 100 has a first screen aspect ratio of 4:3 and displays a video signal having the same aspect ratio to illuminate a region 105 comprising the entire display area of the first display device 100. In this case, the external video signal is suited to the display device. Referring to FIG. 3, a second display device 102 has a second screen aspect ratio 16:9 and displays an external video signal having the same aspect ratio to illuminate a region 107 comprising the entire display area of the second display device 102. Again, in this second case, the external video signal is suited to the second display device. However, referring to FIG. 4, in a third case if the first display device 100 receives a video signal having a different aspect ratio of 16:9, primary region 105' is illuminated while secondary regions 104 of the display may not be illuminated. Similarly, referring to FIG. 5, in a fourth case if the second display device 102 receives an external video signal having a different aspect ratio of 4:3, primary region 107' is illuminated while secondary regions 106 of the display may not be illuminated.

For some display devices, illumination of one portion of a display device only does not have an effect on the display device. For example liquid crystal devices use a backlight to illuminate the entire viewing area of the display even if only a portion of the display has information. In this case, the light illuminating the region of the display that has no information is blocked by the liquid crystals. For other display devices, however, illuminating one region of a display and not others for any significant period of time results in differential aging of the display pixels in such areas, such that the pixels in the illuminated area are aged and those in the dark areas are not. Differential aging can result in differential performance of a pixel, such as differential brightness. When a standard video signal is then displayed on a standard television screen on which non-standard video signals have been displayed over an extended period of time, the top and bottom horizontal regions of the television screen as illustrated in FIG. 4 may be distinctly brighter than the middle horizontal region of the television screen due to the differential aging of pixels in such areas. A similar phenomenon occurs when a standard video signal is displayed on a non-standard television screen for an extended period of time (as illustrated in FIG. 5), causing the middle vertical region of the nominal scanning area of the display to appear darker than the respective left and right vertical regions of the display. This differential aging phenomenon thus can result in visible artifacts when the display is uniformly illuminated. Most viewers will complain about this phenomenon.

This problem has been addressed for televisions using a cathode ray tube display. U.S. Pat. No. 6,359,398 B1 entitled "Method to control CRT phosphor aging" issued Mar. 19, 2002 describes methods and apparatus that are provided for equally aging a cathode ray tube (CRT). A video input terminal is coupled to the CRT and receives an external video signal. Control circuitry is provided, which detects the aspect ratio of the signal and determines whether there is a mismatch between the signal aspect ratio and an aspect ratio of a display screen in association with the CRT. If a mismatch between the signal aspect ratio and the screen aspect ratio exists, an equalization video signal is derived from the external video signal. A primary region of the CRT is illuminated in response to the external video signal, and a secondary region of the CRT, which would otherwise not be illuminated in response to the external video signal due to the mismatch between the signal aspect ratio and the screen aspect ratio, is illuminated in response to the equalization video signal. In this manner, the CRT is uniformly aged. However, the solution proposed requires the use of blocking means such as doors or covers that may be manually or automatically provided to shield the illuminated secondary regions from view when the equalization video signal is applied to the display. This solution is unlikely to be acceptable to most viewers. U.S. Pat. No. 6,369,851 entitled "Method and Apparatus to Minimize Burn Lines in a Display" issued Apr. 9, 2002 describes a method and apparatus for displaying a video signal using an edge modification signal to minimize burn lines. However, this solution only reduces the burn lines at the edges of the regions and does not address overall brightness differences between different regions.

The general problem of brightness differences due to aging has also been addressed for OLED display devices. An OLED display includes organic materials that glow in response to a current passed through the materials. Over time, the response of the organic materials to the current declines and the display becomes less bright. If one pixel of a display receives more current and emits more light over a significant period of time, that pixel of the display will not be as bright as pixels for which less current is supplied. One proposed solution is found in WO2004027744 A1 entitled "Matrix Display Device with Photosensitive Element" published Apr. 1, 2004. This disclosure describes a matrix display device that comprises an array of addressable pixels each having a display element and a control circuit for controlling the operation of the display element. The control circuit includes a charge storage capacitor and a photosensitive device coupled to the storage capacitor for regulating charge stored on the storage capacitor in accordance with light falling on the photosensitive device. However, such a solution requires a complex driving circuit for each pixel and with additional control elements.

A variety of other methods for measuring or predicting the aging of the OLED materials in displays are known in the art. Most such techniques do not compensate for the differential aging created by signals and displays having different aspect ratios. U.S. Pat. No. 6,414,661 entitled "Method And Apparatus For Calibrating Display Devices And Automatically Compensating For Loss In Their Efficiency Over Time" issued Jul. 2, 2002 to Shen et al, e.g., describes a method and associated system that compensates for long-term variations in the light-emitting efficiency of individual organic light emitting diodes (OLEDs) in an OLED display device, by calculating and predicting the decay in light output efficiency of each pixel based on the accumulated drive current applied to the pixel and derives a correction coefficient that is applied to the next drive current for each pixel. Similarly, U.S. Pat. No. 6,504,565 entitled "Light-Emitting Device, Exposure Device, And Image Forming Apparatus", issued Jan. 7, 2003 to Narita et al describes a light-emitting device which includes a light-emitting element array formed by arranging a plurality of light-emitting elements, a driving unit for driving the light-emitting element array to emit light from each of the light-emitting elements, a memory unit for storing the number of light emissions for each light-emitting element of the light-emitting element array, and a control unit for controlling the driving unit based on the information stored in the memory unit so that the amount of light emitted from each light-emitting element is held constant. US Published Patent Application No. 2002/0167474 entitled "Method Of Providing Pulse Amplitude Modulation For OLED Display Drivers" published Nov. 14, 2002 by Everitt describes a pulse width modulation driver for an organic light emitting diode display. One embodiment of a video display comprises a voltage driver for providing a selected voltage to drive an organic light emitting diode in a video display. The voltage driver may receive voltage information from a correction table that accounts for aging, column resistance, row resistance, and other diode characteristics. These methods require complex circuitry and storage techniques for every pixel, greatly increasing the complexity of the display.

Accordingly, there is a need for an improved method and apparatus for uniformly aging a display device of one aspect ratio when driven by a video signal having a different aspect ratio.

SUMMARY OF THE INVENTION

In accordance with one embodiment, the invention is directed towards a method for uniformly aging an OLED display device, the OLED display device including a display screen with a screen aspect ratio, the method comprising: receiving a first external video signal having a first signal aspect ratio different from the screen aspect ratio; illuminating a primary region of the OLED display in response to the first external video signal, whereby a secondary region of the OLED display is not illuminated in response to the first external video signal; receiving a second external video signal having a second signal aspect ratio different from the first external video signal aspect ratio, wherein the display area corresponding to the second signal aspect ratio includes at least a portion of each of the primary and of the secondary regions of the OLED display; generating a regional correction value corresponding to the primary and secondary regions of the OLED display; employing the regional correction value to correct the second external video signal to compensate for differential aging in the included portions of the primary and secondary regions of the OLED display resulting from differential illumination of the primary and secondary regions of the OLED display in response to the first external video signal; and illuminating the OLED display in response to the corrected second external video signal.

ADVANTAGES

The present invention provides an OLED display having a longer lifetime and improved image quality.

DETAILED DESCRIPTION OF THE INVENTION

Figure 1:
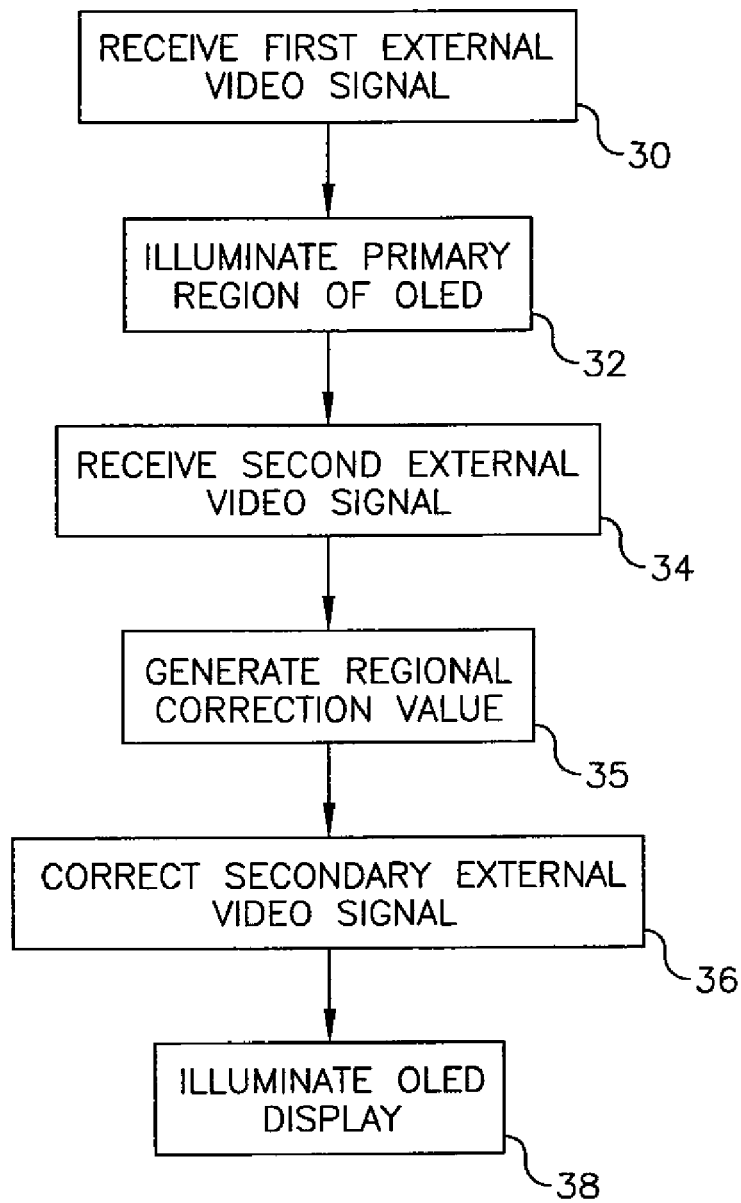
FIG. 1 is a flow graph illustrating the method of one embodiment of the present invention.
Figure 2:
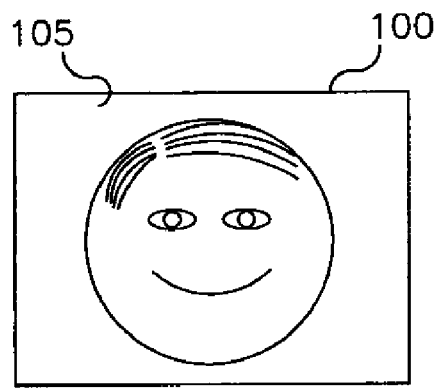
FIG. 2 is a schematic illustrating a standard aspect ratio display with a standard aspect ratio video signal.
Figure 3:
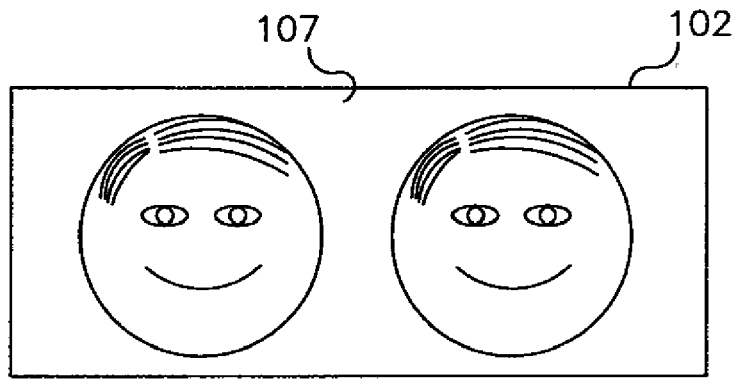
FIG. 3 is a schematic illustrating an HDTV aspect ratio display with an HDTV aspect ratio video signal.
Figure 4:
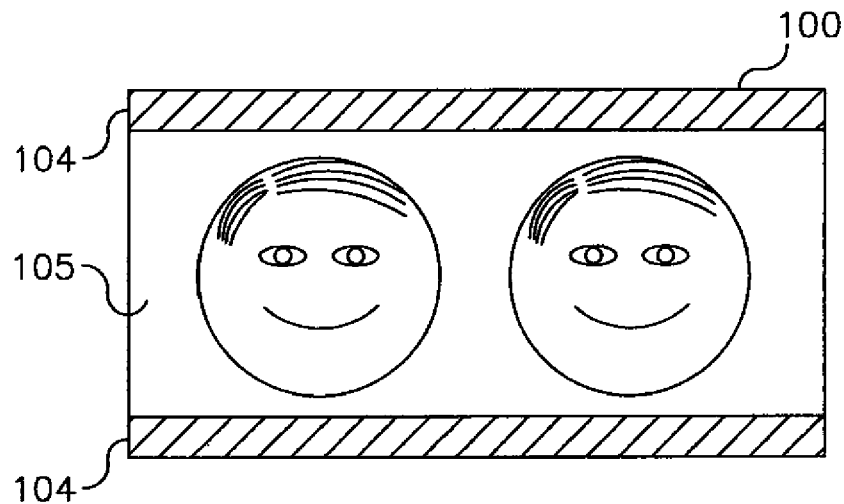
FIG. 4 is a schematic illustrating a standard aspect ratio display with an HDTV aspect ratio video signal.
Figure 5:
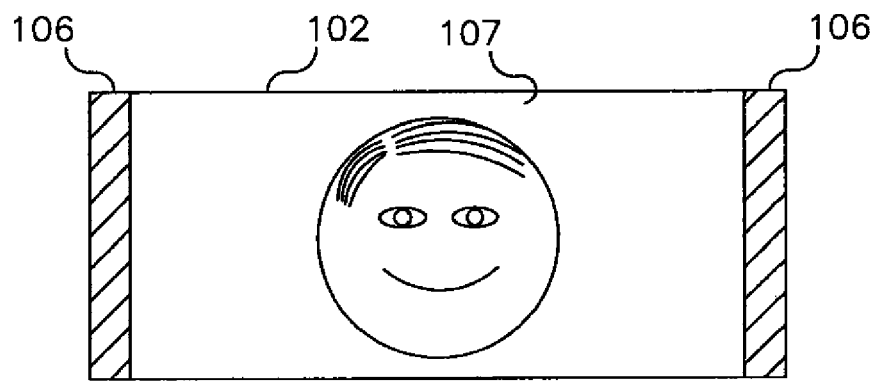
FIG. 5 is a schematic illustrating an HDTV aspect ratio display with a standard aspect ratio video signal.

Referring to FIG. 1, a method for uniformly aging an OLED display device, the OLED display device including a display screen with a screen aspect ratio, includes the steps of receiving 30 a first external video signal having a first signal aspect ratio different from the screen aspect ratio; illuminating 32 a primary region of the OLED display in response to the first external video signal, whereby a secondary region of the OLED display is not illuminated in response to the first external video signal; receiving 34 a second external video signal having a second signal aspect ratio different from the first external video signal aspect ratio, wherein the display area corresponding to the second signal aspect ratio includes at least a portion of each of the primary and of the secondary regions of the OLED display; generating 35 a regional correction value corresponding to the primary and secondary regions of the OLED display; employing the regional correction value to correct 36 the second external video signal to compensate for differential aging in the included portions of the primary and secondary regions of the OLED display resulting from differential illumination of the primary and secondary regions of the OLED display in response to the first external video signal; and illuminating 38 the OLED display in response to the corrected second external video signal. In the illustrations of FIGS. 4 and 5, the secondary regions are regions 104 and 106.

Figure 11:
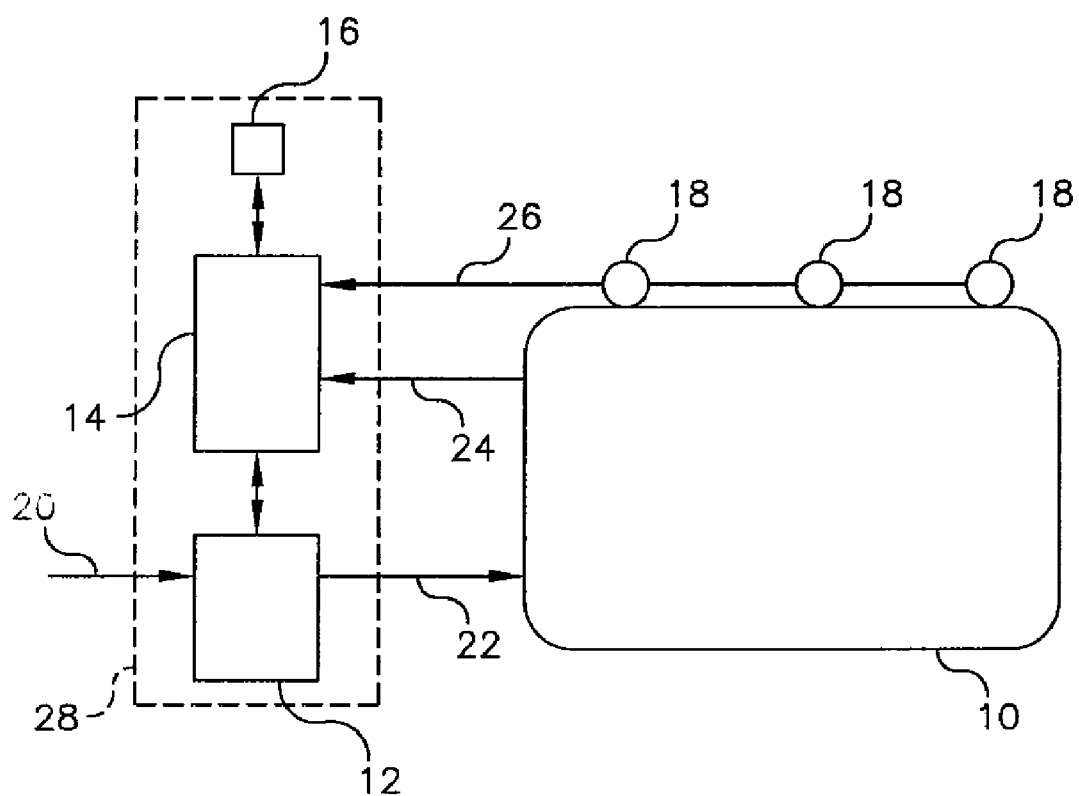
FIG. 11 is a schematic illustrating a display with sensors and control circuitry.

Referring to FIG. 11, the method of the present invention may be implemented with an OLED display screen 10 and a controller 12 for controlling and correcting an input external video signal 20 to form a corrected video signal 22. The controller 12 may include video circuitry for processing the first and second external video signals and for driving the OLED display device 10. Circuitry 14 may be employed to interact with the display device 10 and circuitry 16 may be employed to store data. The controller 12, circuitry 14, and circuitry 16 may be formed in a common electronic device 28 and use integrated circuits well known in the art.

In operation, a first external video signal 20 having a different aspect ratio from the OLED display device is received 30 by the controller 12. In an initial state, the OLED display device is not yet differentially aged and no correction is applied to the first external video signal so that the OLED display 10 receives an uncorrected video signal, illuminating 32 a primary region of the OLED display device 10 and not illuminating a secondary region thereby differentially aging the OLED display 10. After some time, a second external video signal having the same aspect ratio as the OLED display 10 may be received 34. Because the aspect ratio of the signal and the display match, the signal will illuminate the entire display, thus including both of the primary and the secondary regions of the OLED display. However, because of the differential aging caused by the first external video signal, the secondary region of the display will appear brighter than the primary region of the display. To compensate for this, a regional correction value corresponding to the differential aging of the primary and secondary regions of the OLED display is generated 35. The controller 12 corrects 36 the secondary external video signal to form a corrected video signal 22 that is then applied to the OLED display 10. The display is then illuminated 38.

Typically, the correction applied by the controller 12 is performed on every pixel within either the primary and/or secondary region by a lookup table, matrix transform, scaling factor, and/or offset in the controller that converts each of the pixels in the associated region. Each of the pixels in the primary region, e.g., may be converted to brighter pixels of the same color. Alternatively, each of the pixels in the secondary region may be made dimmer. Analog and digital lookup tables, multipliers, adders, and associated addressing circuitry are well known in the art. Techniques using multiply and add circuitry to modify and correct the video signals may also be employed and are well known in the art.

Figure 6:
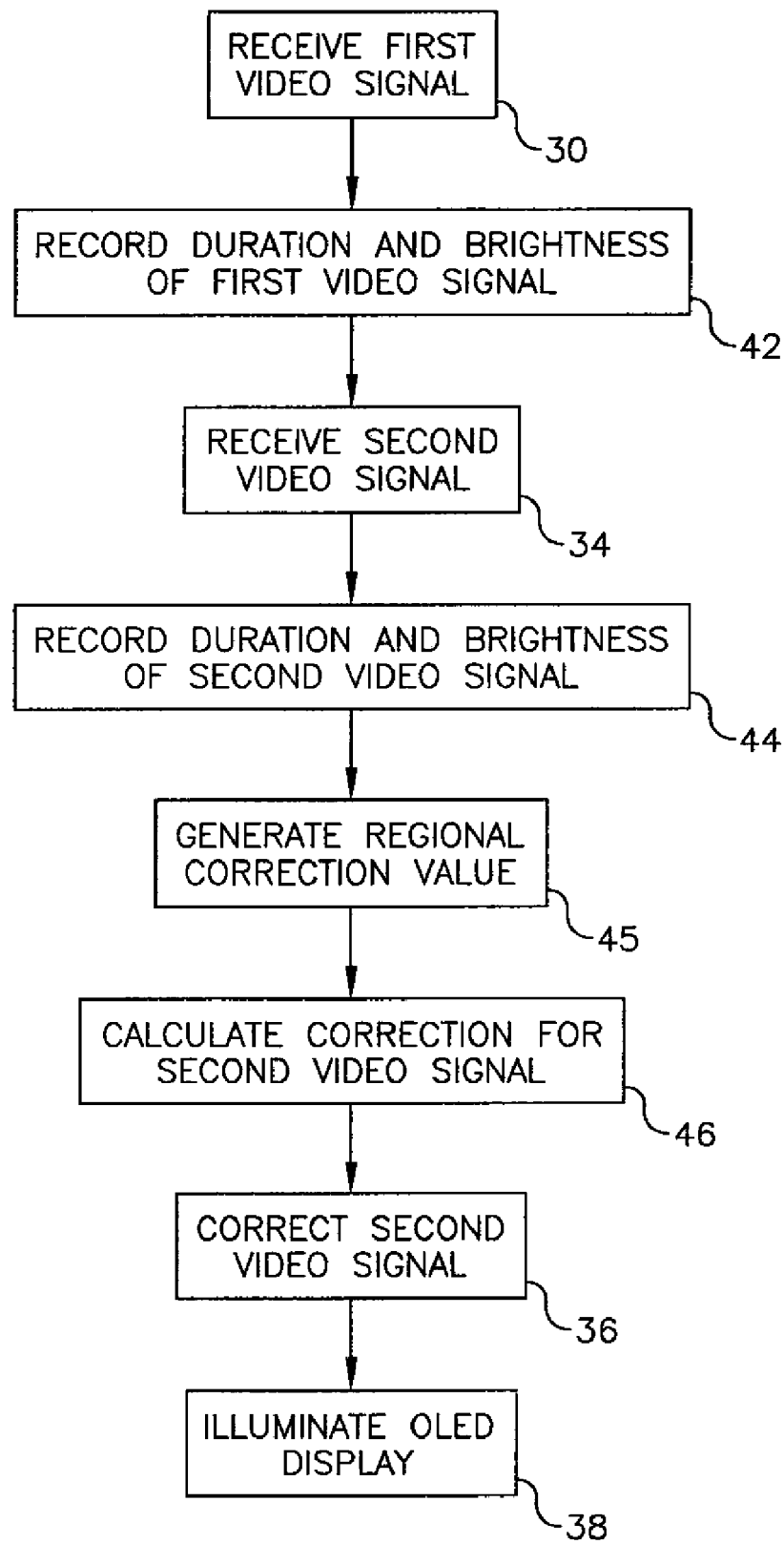
FIG. 6 is a flow graph illustrating an alternative embodiment of the method of the present invention.

The information necessary to calculate the correction value may be obtained in a variety of ways. Referring to FIG. 6, the brightness and duration of the video signal in the primary and secondary regions is recorded 42, 46 for each video signal.

Referring again to FIG. 11, circuitry 14 may be employed to calculate the average brightness over time in each region of the display for the external video signals 20 applied to the controller 12. The average brightness over time can be converted to an approximate relative aging factor of the display 10 and the associated relative correction calculated. In an alternative embodiment of the present invention, the brightness may be presumed to be the brightness experienced by a large set of video signals. In this embodiment, only the time for which the different aspect ratio video signals are displayed need be recorded. This information may be stored in the memory 16 and supplied to the controller for correcting input video signals. The correction information may be periodically or continuously updated. If the signal is continuously updated, a correction is continuously calculated as the signal record of duration and brightness is updated and continuously applied. Alternatively, a new correction may be applied every time the OLED display is turned on. The record of brightness and duration of signal is readily calculated by summing pixel values in each region for each frame of the video signal. Such accumulation calculations are readily performed at video rates by conventional digital circuitry. If only duration is recorded, a simple clock may be employed.

In an alternative embodiment of the present invention, the regional correction values are generated from a measurement of the relative performance of the OLED display in the primary and secondary regions. For example, the relative performance may be based upon the relative brightness of the primary and secondary regions in response to a uniform illumination signal.

Figure 7:
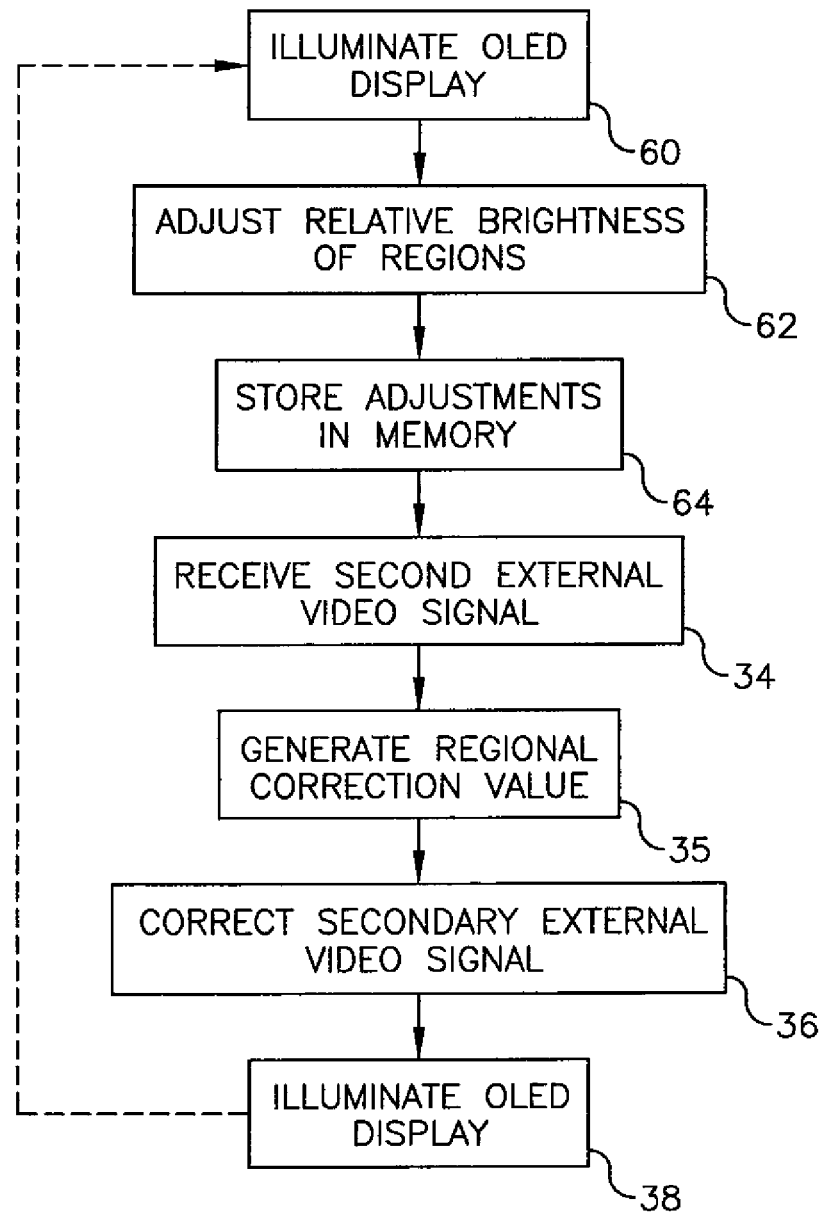
FIG. 7 is a flow graph illustrating another alternative embodiment of the method of the present invention.

Referring to FIG. 7, the OLED display 10 is illuminated 60 with a uniform signal over all of the regions, If differential aging has taken place, some regions will be dimmer and others will brighter. This difference may be perceptible to a viewer of the display and a suitable adjustment mechanism supplied to allow the viewer to correct the differences. The viewer adjusts 62 the relative brightness of the regions until they are perceptibly identical and the adjustments are stored, for example in a storage element 16 (FIG. 11). Once stored, the adjustments may be employed to generate a regional correction value that is applied by the controller to correct the input video signal to compensate for differential aging in the regions.

Figure 8:
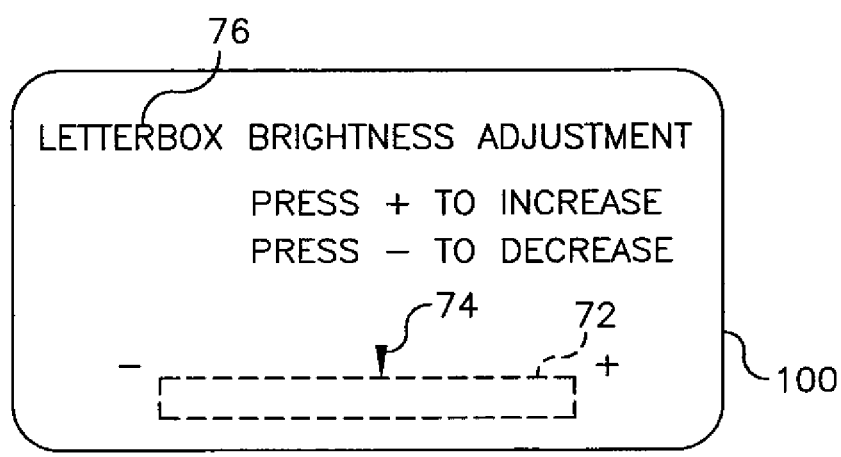
FIG. 8 is a schematic illustrating a display with a user interface.

Referring to FIG. 8, an on-screen adjustment mechanism may be provided on the display. Instructions 76 to a viewer may instruct the viewer to press buttons on a remote control or on the display device to move an indicator 74 representing the relative brightness of the regions on a scale 72. The viewer may press the buttons to instruct the controller to adjust the relative brightness of the regions. As the controller adjusts the relative brightness, the viewer can provide feedback until the apparent brightness of the regions are identical. The viewer then ceases any further adjustments. The adjustments indicated are stored, for example in storage element 16. A separate correction factor may be supplied for a variety of display brightness levels by illuminating the various regions at a variety of brightness levels and repeating the calibration. The technology necessary for adjusting the display characteristics of a display are well known and are, for example, used today to adjust brightness, contrast, and color in conventional televisions, and may be employed in accordance with the present invention to obtain relative regional brightness adjustment values.

Figure 9:
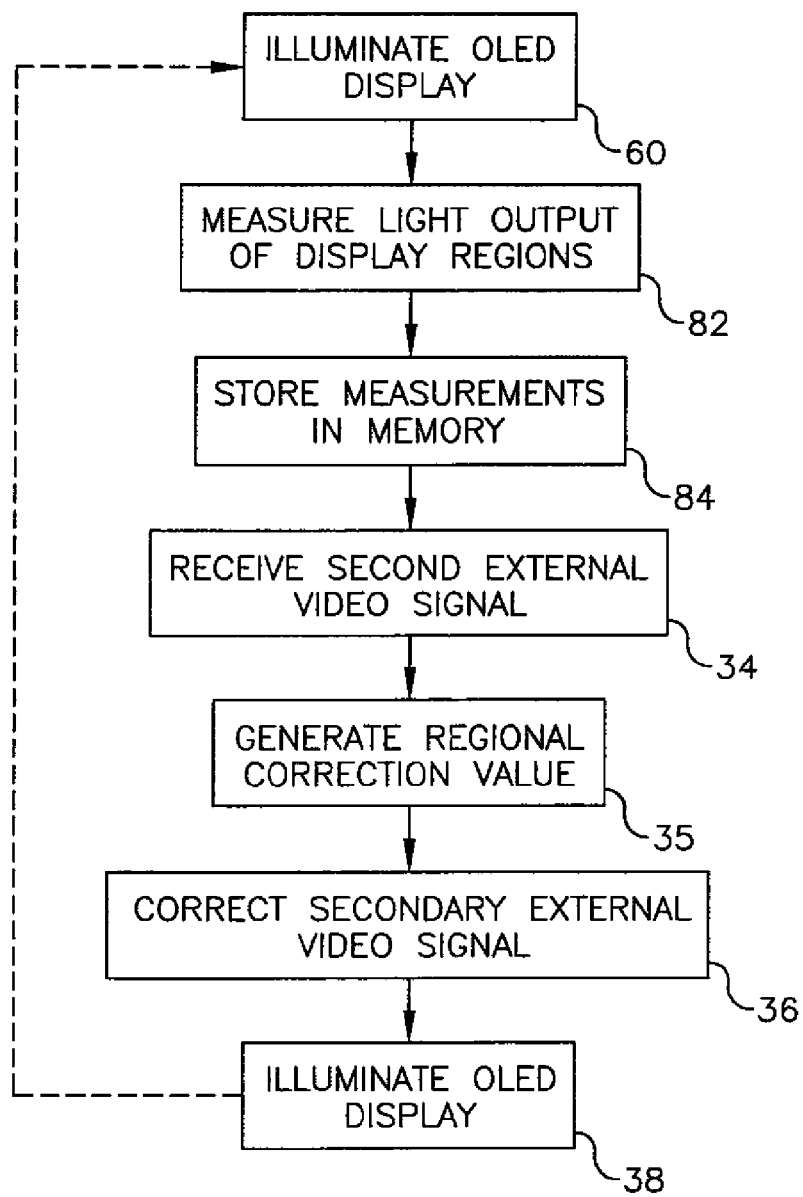
FIG. 9 is a flow graph illustrating an embodiment of the method of the present invention.

In yet another embodiment of the present invention, a measurement of the relative brightness of the display regions may be automated through the use of photo-detectors. Referring to FIG. 9, the display may be illuminated 60 with a uniform signal. The brightnesses of the regions may then be measured 82. These measurements may be stored 84 in a storage element 16 and provided to the controller for generating a regional correction value and correcting subsequent input video signals. The brightnesses of the regions may be measured periodically to correct for differential aging as the display is used (indicated by the dashed line). Furthermore, a separate correction factor may be supplied for each signal level by illuminating the various regions at a variety of brightness levels.

Figure 10:
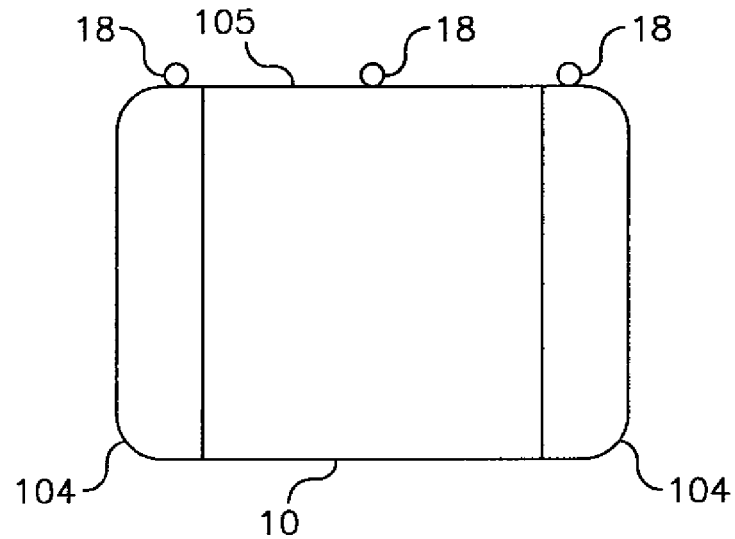
FIG. 10 is a schematic illustrating a display with sensors associated with display regions.

The measurement of light output may be performed using a device external to the display or, preferably, integrated into the display. For example, referring to FIGS. 10 and 11, a photo-detector 18 may be associated with each region. As the regions are illuminated by a test signal, the display response in each region will be detected by the corresponding photo-detector. A signal 26 from the photo-detectors may be supplied to circuitry 14 and stored in the storage element 16, and supplied to the controller for correcting input video signals. Useful photo-sensors or alternative light output performance detection mechanisms are described in U.S. Pat. Nos. 6,320, 325 and 6,720,942 and U.S. Patent Publication Nos. 2004/0032382, 2004/0070558, 2004/0188687 and 2004/0200953.

In an alternative embodiment, the regional correction value may be generated from a measurement of the relative current used by the primary and secondary regions. Because the effective resistance of an OLED increases as it ages, the current passing through the OLED at a fixed voltage indicates the extent of the OLED material aging. US 2004/0150590, e.g., describes the use of current measurements to compensate for OLED aging. As applied to the present invention, a signal 24 (FIG. 11) representing the current used by the display 10 may be measured by circuitry 14. By employing specified display signals that specifically illuminate the primary an d secondary regions corresponding to a specific aspect ratio, a current measurement associated with the aging experienced in each region may be obtained, and may be employed by the controller to generate a regional correction value.

In yet another alternative embodiment, the regional correction value may be generated from a measurement of the relative performance of representative pixels for the primary and secondary regions of the OLED display wherein the representative pixels for the primary region and the secondary region are illuminated at an average brightness corresponding to the average brightness of the illumination of the corresponding region. The use of representative pixels to track the aging of an OLED device is described, e.g., in U.S. Pat. No. 6,320,325 and US 2004/0070558. A representative pixel can include additional pixels that are driven to match the usage of an average pixel in a display or it can include a display pixel itself, if it is driven at an average brightness corresponding to the average brightness of the illumination of the corresponding region. Since video signals, in particular, tend to an average value, representative pixels can be excellent proxies for the aging of the pixels in a region. A separate representative pixel may be provided for each region for each color of the OLED display device. A variety of performance measurements of the representative pixels may be employed, for example the brightness of the representative pixels or the current used by the representative pixels.

In these embodiments of the present invention, only the information describing the relative performance of a display region is stored in the storage element 16. Since the aspect ratio of the display and video signals define the primary and secondary regions, each pixel will be a member of a defined region, and will employ the correction values associated with that region. While one or more values may be stored for each region, it is not necessary to store a separate value for each pixel element, or each row or column in the region. Therefore, the amount of information that must be stored is greatly reduced. Likewise, it is not necessary to analyze information for every pixel. This greatly reduces the computational circuitry necessary to implement the present invention.

It is possible for the present invention to compensate for more than two signals having different aspect ratios. A variety of aspect ratios and differentially aged regions may be accommodated by providing a correction relevant to each region, using the techniques described above. It is possible that the regions may, or may not, overlap if signals with more than two aspect ratios are accommodated. In every case, the relative performance of each region or overlapping areas of two or more regions may be discovered and corrected. Correction values may be combined in display areas where regions corresponding to different aspect ratios overlap. For example, in a further embodiment, the method of the present invention may comprise the additional step of receiving a third external video signal having a third aspect ratio different from the first and second external video signals, wherein the display area corresponding to the third signal aspect ratio comprises a tertiary region that excludes at least a portion of at least one of the primary and secondary regions of the OLED display, and generating a regional correction value corresponding to the tertiary region of the OLED display. The primary, secondary, and tertiary regions may or may not be mutually exclusive.

The primary, secondary, and/or tertiary regions may take a variety of forms. Typically, industry-standard aspect ratios, such as 4:3, 16:9, or 2:1 may be employed. For example the second signal aspect ratio may be the same as the screen aspect ratio and the first signal aspect ratio may be greater than the screen aspect ratio. In a specific embodiment, the first signal aspect ratio may be 16:9 and the screen aspect ratio may be 4:3. This embodiment is useful for standard-definition televisions. Alternatively, the first signal aspect ratio may be less than the screen aspect ratio and the first signal aspect ratio may be 4:3 while the screen aspect ratio is 16:9.

In a preferred embodiment, the present invention is employed in a flat-panel OLED display device composed of small molecule or polymeric OLEDs as disclosed in but not limited to U.S. Pat. No. 4,769,292, issued Sep. 6, 1988 to Tang et al., and U.S. Pat. No. 5,061,569, issued Oct. 29, 1991 to VanSlyke et al. Many combinations and variations of organic light-emitting displays can be used to fabricate such a device, including both active-and passive-matrix OLED displays having either a top-or bottom-emitter architecture.

The invention has been described in detail with particular reference to certain preferred embodiments thereof, but it will be understood that variations and modifications can be effected within the spirit and scope of the invention.

PARTS LIST

10 display
12 controller
14 circuitry
16 storage element
18 photo-detector
20 external video signal
22 corrected video signal
24 signal
26 signal
28 electronic device
30 receive first signal step
32 illuminate display step 34 receive second signal step
35 generate regional correction 38 value step
36 correct signal step
38 illuminate step
42 record duration and brightness step
44 record duration and brightness step
45 generate regional correction value step
46 calculate correction step
60 illuminate OLED display step
62 adjust relative brightness of regions step
64 store adjustments in memory step
72 scale
74 indicator
76 instructions
82 measure light output step
84 store measurements in memory step
100 display
102 display
104 region
105 region
105' region
106 region
107 region
107' region

The invention claimed is:

1. A method for uniformly illuminating an OLED display device, the OLED display device including a display screen with a screen aspect ratio, the method comprising:
receiving a first external video signal having a first signal aspect ratio different from the screen aspect ratio;
illuminating a primary region of the OLED display in response to the first external video signal, whereby a secondary region of the OLED display is not illuminated in response to the first external video signal;
receiving a second external video signal having a second signal aspect ratio different from the first external video signal aspect ratio, wherein the display area corresponding to the second signal aspect ratio includes at least a portion of each of the primary and of the secondary regions of the OLED display;
generating regional correction values corresponding to the primary and secondary regions of the OLED display;
employing the regional correction value to correct the second external video signal to compensate for differential aging in the portions of the primary and secondary regions of the OLED display resulting from differential illumination of the primary and secondary regions of the OLED display in response to the first external video signal;
illuminating the portions of the primary and secondary regions of the OLED display included in the second external video signal in response to the corrected second external video signal; and
recording the duration of illumination of the OLED display in response to the corrected second external video signal, and wherein the regional correction value is generated in response to the durations of the first and corrected second external video signals.

2. The method of claim 1, wherein the regional correction value is generated based upon the relative durations of the first and corrected second external video signals.

3. The method of claim 1, further comprising the step of calculating and storing the average brightness of the first and corrected second external video signals, and wherein the regional correction value is generated in response to the stored average brightness and durations of the first and corrected second external video signals.

4. The method of claim 1, wherein the second signal aspect ratio is the same as the screen aspect ratio.

5. The method of claim 1, wherein the first signal aspect ratio is greater than the screen aspect ratio.

6. The method of claim 5, wherein the first signal aspect ratio is 16:9 and the screen aspect ratio is 4:3.

7. The method of claim 1, wherein the first signal aspect ratio is less than the screen aspect ratio.

8. The method of claim 7, wherein the first signal aspect ratio is 4:3 and the screen aspect ratio is 16:9.

9. The method of claim 1, wherein the OLED display device is an active-matrix device.

10. The method of claim 1, wherein the OLED display device is a passive-matrix device.

11. The method of claim 1, wherein the regional correction value is generated from a measurement of the relative performance of the OLED display in the primary and secondary regions.

12. The method of claim 11, wherein the relative performance is based upon the relative brightness of the primary and secondary regions in response to a uniform illumination signal.

13. The method of claim 12, further comprising the step of adjusting the brightness of the primary and secondary regions to provide a uniform brightness, storing the adjustments, and wherein the correction is based upon the stored adjustments.

14. The method of claim 13, further comprising the step of periodically repeating the adjustment.

15. The method of claim 13, wherein the adjustment is done by a viewer.

16. The method of claim 15, wherein the adjustment is done by providing an on-screen interactive adjustment.

17. The method of claim 12, further comprising the step of measuring the light output of the primary and secondary regions.

18. The method of claim 17, wherein the measurement is done using a photo-sensor integrated into the display and formed on the same substrate.

19. The method of claim 12, wherein a plurality of regional correction values are calculated at a corresponding plurality of brightness levels.

20. The method of claim 1, wherein the regional correction value is generated from a measurement of the relative performance of representative pixels for the primary and secondary regions of the OLED display wherein the representative pixels for the primary region and the secondary region are illuminated at an average brightness corresponding to the average brightness of the illumination of the corresponding region.

21. The method of claim 20, wherein a separate representative pixel is provided for each color of the OLED display device.

22. The method of claim 20, wherein the measurement is the brightness of the representative pixels.

23. The method of claim 20, wherein the measurement is the current used by the representative pixels.

24. The method of claim 1, wherein the regional correction value is generated from a measurement of the relative current used by the primary and secondary regions.

25. The method of claim 1, further comprising the step of receiving a third external video signal having a third aspect ratio different from the first and second external video signals, wherein the display area corresponding to the third signal aspect ratio comprises a tertiary region that excludes at least a portion of at least one of the primary and secondary regions of the OLED display, and generating a regional correction value corresponding to the tertiary region of the OLED display.

26. The method of claim 25, wherein the primary, secondary, and tertiary regions are not mutually exclusive.

27. An OLED display device including a display screen with a screen aspect ratio, comprising:
- a video circuit for receiving a first external video signal having a first signal aspect ratio different from the screen aspect ratio and a second external video signal having a second signal aspect ratio different from the first external video signal aspect ratio, wherein the display area corresponding to the second signal aspect ratio includes at least a portion of each of the primary and of the secondary regions of the OLED display;
- a controller for (i) illuminating a primary region of the OLED display in response to the first external video signal, whereby a secondary region of the OLED display is not illuminated in response to the first external video signal, (ii) generating a regional correction value corresponding to the primary and secondary regions of the OLED display, wherein the controller employs the regional correction value to correct the second external video signal to compensate for differential aging in the portions of the primary and secondary regions of the OLED display resulting from differential illumination of the primary and secondary regions of the OLED display in response to the first external video signal, and (iii) illuminating portions of the primary and secondary regions of the the display area, included in the second external video signal corresponding to the second signal aspect ratio in response to a corrected second external video signal; and
- a storage element that records the duration of illumination of the OLED display in response to the corrected second external video signal, and wherein the regional correction value is generated in response to the durations of the first and corrected second external video signals.

* * * * *